Patented May 25, 1926.

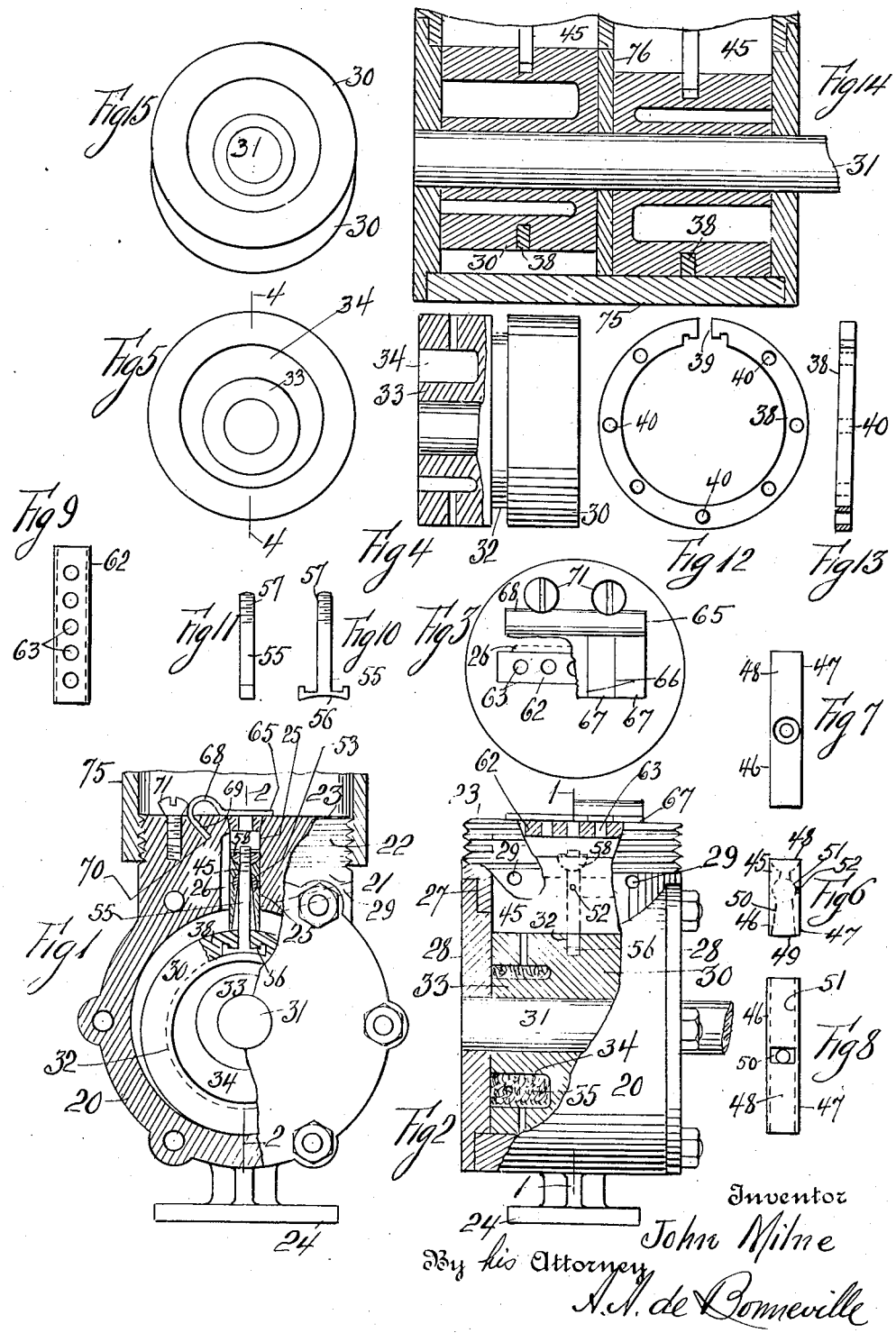

1,586,211

UNITED STATES PATENT OFFICE.

JOHN MILNE, OF NEW YORK, N. Y.

COMPRESSOR.

Application filed April 27, 1922. Serial No. 556,986.

This invention relates to a compressor. The object of the invention is the production of a compressor with but few parts, and simple in construction. A second object of the invention is the production of a compressor of the rotary type in which the cylindrical piston thereof moves in the interior of the cylinder, to compress and discharge air or other fluids drawn therein. A third object of the invention is the production of a rotary compressor with a sliding partition that rides on its cylindrical piston which is eccentrically located in the cylinder. A fourth object of the invention is the production of a compressor in which the piston thereof with its parts coacting can move either at a high or low rotative speed. A fifth object of the invention is a compressor with a plurality of pistons, that actuate independently of each other with respect to the fluids operating with each.

Fig. 1 represents a side view and partial section of Fig. 2 on the line 1, 1. Fig. 2 shows a partial right hand side view and section of Fig. 1 on the line 2, 2; Fig. 3 shows a top plan view of Fig. 2; Fig. 4 represents a partial side view and partial section of the piston of the compressor as on the line 4, 4 of Fig. 5; Fig. 5 indicates a side view of Fig. 4; Fig. 6 represents a front view of the sliding partition of the compressor; Fig. 7 shows a top plan view of Fig. 6; Fig. 8 indicates a bottom plan view of Fig. 6; Fig. 9 shows a top plan view of a valve seat; Fig. 10 represents an elevation of a bolt; Fig. 11 is a side view of Fig. 10; Fig. 12 shows an elevation of a piston ring; Fig. 13 is an end view of Fig. 12; Fig. 14 represents a vertical axial section of a modification of the invention and Fig. 15 indicates a side view of some of the elements of Fig. 14.

The cylinder 20 of the compressor has formed therewith, in this instance at its upper end the outlet hub 21 with the exterior threads 22 and the upper face 23. A foot 24 is formed with the cylinder 20. In the cylinder and hub are formed the partition guide opening 25 rectangular in cross section. An outlet port 26 extends from the interior of the cylinder and connects with the opening 25. At the intersection of the cylinder 20 and the hub 21 are formed circular recesses 27. Covers 28 are bolted to the side faces of the cylinder 20 and engage said recesses 27. Inlet ports 29 are formed in the hub 21 and extend to the interior of the cylinder 20.

A cylindrical piston or rotor 30 is eccentrically located in the cylinder 20 and is supported on the driving shaft 31. The said piston 30 has formed therewith the circumferential groove 32, the hub 33 and the eccentric side cavities 34. Wicking 35 saturated with a lubricating agent is located in the cavities 34. A piston ring 38 is slidably seated in the groove 32 and has formed therewith the T shaped opening 39 and the openings 40. A sliding partition 45 is indicated with its side faces 46, 47, the flat top face 48 and the bottom face 49, which latter may be flat or slightly curved. The said partition 45 divides the cylinder 20 into two compartments. A tapered opening 50 extends through the partition from the top face 48 to the bottom face 49. A longitudinal opening 51 extends through the partition and a branch opening 52 extends from the opening 51 to the side face 47. Wicking 53 saturated with a lubricant is located in the opening 51. A bolt 55 with the T shaped head 56 and the threaded end 57 extends through the partition 45 with its T shaped head 57 and locks with the T shaped opening 39 of the ring 38. A nut 58 with a spherical bottom face engages the threaded end 57 of the bolt 55. The bolt 55 connects the sliding partition 45 and the ring 38. The tapered opening 50 of the partition 45 provides clearance space for the bolt 55, for any lateral movement of the ring 38, when the piston 30 revolves with the rotation of the driving shaft 31. A valve seat 62 with a plurality of supplemental outlet ports 63 extends down from the face 23 over the valve guide opening 25. A flexible flap valve 65 has formed a plurality of slits 66, to form at one end thereof the plurality of fingers 67, that normally cover the ports 63. At the other end of the valve 65 is formed the loop 68 with the hook end 69, and the latter is locked in the slot 70, formed in the hub 21. Tension screws 71 are threaded into the hub 21 and their heads bear against the loop 68, to regulate the tensional resistance of the valve 65, and the pressure between the fingers 67 and the valve seat 62. Referring to Figs. 14 and 15 the invention is modified by locating within the cylinder 75 a pair of pistons 30 fastened to the shaft 31. A separator plate which divides the cylinder into two chambers, bears against the adjacent faces of said pistons 30. Each of the pistons 30 is shown with the ring 38 and the sliding partition 45. In this instance the pistons 30 are fastened to the driving shaft 31 with their eccentricities in diametrically opposite positions.

Referring to Figs. 1 to 13, when the shaft 31 is rotated, the piston 30 will move and air or other fluid is drawn into the cylinder 30 through the inlet ports 29. Immediately after the piston leaves the crown of the interior circumferential surface of the cylinder 20, the air or other fluid operated upon enters the said cylinder through the inlet ports 29. Upon the further movement of the piston the air or other fluid continues to enter the cylinder 20, until the cycle of the movement of the piston has been completed. At the same time the air or fluid that had entered the cylinder in the previous cycle has been compressed and discharged from the cylinder, by way of the outlet port 26 and the ports 63. From the latter the air or fluid enters the duct 75 to be directed to the place desired. The present exemplification of the invention is to be taken as illustrative and not limitative thereof.

Having described my invention what I desire to secure by Letters Patent and claim is:

1. In a compressor the combination of a cylinder having an inlet port, an outlet port and a guide opening, a moving cylindrical piston eccentrically supported in the cylinder and having a circumferential groove, a piston ring slidably supported in said groove, a partition slidably guided in said guide opening with its lower face riding on the circumferential surface of the piston and means to adjustably connect said partition and ring.

2. In combination, a cylinder having inlet and outlet ports and a guide opening, a moving cylindrical piston eccentrically supported in the cylinder, a piston ring supported on the piston, a partition guided in said guide opening with its lower face bearing on the circumferential surface of the ring and means to maintain contact between the circumferential surface of the ring and the lower end of said partition.

3. In a compressor the combination of a cylinder having an inlet port and an outlet port and a guide opening coacting with said outlet port, a rotating cylindrical piston eccentrically supported in the cylinder and having a circumferential groove, a piston ring supported in said groove, a partition having a tapered opening slidably guided in said guide opening with its lower face riding on the circumferential surface of the piston and a bolt extending through the opening of said partition adjustably connecting it and said piston ring.

4. In a compressor the combination of a cylinder having an inlet port and an outlet port and a guide opening co-acting with said outlet port, a moving cylindrical piston eccentrically supported in the cylinder and having a circumferential groove, a piston ring supported in said groove, a partition having a tapered opening slidably guided in said guide opening with its lower face riding on the circumferential surface of the piston and a bolt extending through the tapered opening of said partition adjustably connecting it and the piston ring, an opening for a sliding partition with a supplemental port located at the outer end of the said partition opening, and an automatically operated valve coacting with the supplemental port.

5. In a compressor the combination of a cylinder having an inlet port and an outlet port and a guide opening coacting with said outlet port, a moving cylindrical piston eccentrically supported in the cylinder and having a circumferential groove, a piston ring supported in said groove, a partition having an opening guided in said guide opening with its lower face riding on the circumferential surface of the piston and a bolt extending through the tapered opening of said partition adjustably connecting it and said piston ring, a valve seat with a supplemental port located at the end of the said guide opening distant from said piston ring and an automatically operated valve coacting with said supplemental port.

6. In a compressor the combination of a cylinder having an inlet port and an outlet port, a moving cylindrical piston in said cylinder having a groove in its circumferential face, a ring slidably seated in said groove and means coacting with said ring to divide the cylinder into two compartments.

Signed at the borough of Manhattan, city of New York, in the county of New York and State of New York, this 26th day of April, A. D. 1922.

JOHN MILNE.